US009670429B2

(12) United States Patent
Bell et al.

(10) Patent No.: US 9,670,429 B2
(45) Date of Patent: Jun. 6, 2017

(54) SEPARATION SYSTEMS FOR DEWATERING OF FOG AND BIODIESEL FUEL PRODUCTION

(71) Applicant: SMARTFLOW TECHNOLOGIES, INC., Apex, NC (US)

(72) Inventors: Jason Bell, Pleasant Dale, NE (US); Mark Vander Hoff, Apex, NC (US); Todd Benson, Cary, NC (US); Marc Pugh, Sanford, NC (US)

(73) Assignee: SMARTFLOW TECHNOLOGIES, INC., Apex, NC (US)

(*) Notice: Subject to any disclaimer, the term of this patent is extended or adjusted under 35 U.S.C. 154(b) by 495 days.

(21) Appl. No.: 13/766,172

(22) Filed: Feb. 13, 2013

(65) Prior Publication Data
US 2013/0212932 A1 Aug. 22, 2013

Related U.S. Application Data

(60) Provisional application No. 61/669,338, filed on Jul. 9, 2012, provisional application No. 61/599,750, filed on Feb. 16, 2012.

(51) Int. Cl.
B01D 37/00 (2006.01)
C10L 1/02 (2006.01)
(Continued)

(52) U.S. Cl.
CPC ............ C10L 1/02 (2013.01); B01D 37/00 (2013.01); B01D 61/142 (2013.01); B01D 61/16 (2013.01); B01D 63/084 (2013.01); C10G 3/00 (2013.01); C10G 33/06 (2013.01); C10L 1/026 (2013.01); C11B 13/00 (2013.01); C11C 3/003 (2013.01); B01D 17/10 (2013.01); B01D 2311/04 (2013.01); B01D 2315/10 (2013.01); C02F 1/444 (2013.01); C02F 11/121 (2013.01);
(Continued)

(58) Field of Classification Search
USPC ....... 210/634, 638, 651, 652, 767, 799, 768, 210/348, 500.21
See application file for complete search history.

(56) References Cited

U.S. PATENT DOCUMENTS 4,867,876 A 9/1989 Kopf
4,882,050 A 11/1989 Kopf
(Continued)

FOREIGN PATENT DOCUMENTS

WO WO 2011088373 7/2011
WO WO 2012115932 8/2012

OTHER PUBLICATIONS

Koltuniewicz et al. (1995, J. Membr. Sci. 102, 193-207).*
(Continued)

Primary Examiner — Allison Fitzsimmons
(74) Attorney, Agent, or Firm — Marianna Fuierer; Moore & Van Allen, PLLC

(57) ABSTRACT

The present invention provides for methods and systems that effectively separate dispersed FOG from emulsions and/or free-floating FOG from a waste stream to provide dewatered emulsions and/or separated fats, oils and greases from emulsions thereby providing value added separated product while reducing disposal of solid or liquid waste matter into landfills or water treatment facilities.

4 Claims, 7 Drawing Sheets

(51) Int. Cl.

| | | |
|---|---|---|
| *C10G 3/00* | (2006.01) | |
| *C10G 33/06* | (2006.01) | |
| *C11C 3/00* | (2006.01) | |
| *B01D 61/14* | (2006.01) | |
| *B01D 61/16* | (2006.01) | |
| *B01D 63/08* | (2006.01) | |
| *C11B 13/00* | (2006.01) | |
| *B01D 17/00* | (2006.01) | |
| *C02F 1/44* | (2006.01) | |
| *C02F 11/12* | (2006.01) | |
| *C02F 101/32* | (2006.01) | |

(52) U.S. Cl.
CPC ......... *C02F 2101/325* (2013.01); *Y02E 50/13* (2013.01); *Y02P 30/20* (2015.11); *Y02W 30/74* (2015.05)

(56) References Cited

U.S. PATENT DOCUMENTS

| | | | |
|---|---|---|---|
| 4,956,085 A | 9/1990 | Kopf | |
| 5,034,124 A | 7/1991 | Kopf | |
| 5,049,268 A | 9/1991 | Kopf | |
| D322,117 S | 12/1991 | Kopf | |
| D323,202 S | 1/1992 | Kopf | |
| D324,720 S | 3/1992 | Kopf | |
| D325,070 S | 3/1992 | Kopf | |
| D327,313 S | 6/1992 | Kopf | |
| D328,789 S | 8/1992 | Kopf | |
| 5,232,589 A | 8/1993 | Kopf | |
| 5,342,517 A * | 8/1994 | Kopf | 210/228 |
| 5,360,555 A | 11/1994 | Batten | |
| D357,059 S | 4/1995 | Kopf | |
| 5,543,050 A | 8/1996 | Roshanravan | |
| 5,593,580 A | 1/1997 | Kopf | |
| 5,730,029 A | 3/1998 | Stoldt et al. | |
| 5,868,930 A | 2/1999 | Kopf | |
| 5,972,057 A * | 10/1999 | Hayafuji et al. | 44/388 |
| 6,022,742 A | 2/2000 | Kopf | |
| 6,048,727 A | 4/2000 | Kopf | |
| 6,139,746 A | 10/2000 | Kopf | |
| 6,214,221 B1 | 4/2001 | Kopf | |
| 6,214,574 B1 | 4/2001 | Kopf | |
| 6,383,380 B1 | 5/2002 | Kopf | |
| 6,464,875 B1 | 10/2002 | Woodruff | |
| 6,569,340 B2 | 5/2003 | Kopf et al. | |
| 6,596,172 B1 | 7/2003 | Kopf | |
| 6,827,960 B2 | 12/2004 | Kopf et al. | |
| 6,852,352 B2 | 2/2005 | Kopf et al. | |
| 6,875,459 B2 | 4/2005 | Kopf et al. | |
| 6,946,075 B2 | 9/2005 | Kopf | |
| 7,045,100 B2 * | 5/2006 | Ergun et al. | 422/129 |
| 7,384,562 B2 | 6/2008 | Rogers | |
| 7,544,296 B2 | 6/2009 | Kopf et al. | |
| 7,632,319 B2 | 12/2009 | Rogers | |
| 7,767,839 B2 | 8/2010 | Berry et al. | |
| 8,366,794 B2 | 2/2013 | Tremblay et al. | |
| 2006/0004237 A1 | 1/2006 | Appel et al. | |
| 2011/0309018 A1 | 12/2011 | Kopf et al. | |
| 2012/0205311 A9 | 8/2012 | Kopf et al. | |
| 2013/0015119 A1 | 1/2013 | Pugh et al. | |
| 2013/0115588 A1 | 5/2013 | Davis et al. | |
| 2013/0236938 A1 | 9/2013 | Vander Hoff et al. | |

OTHER PUBLICATIONS

Sivasamy et al. (ChemSusChem 2009, 2, 278-300).*
Chakrabarti, Alicia R. et al. "4Waste Grease Biodiesel Production at a Wastewater Treatment Plant." WEFTEC® 08, 2008, pp. 2770-2789.
Drapcho, Caye M. et al. "Biofuels Engineering Process Technology." 2008 The McGraw-Hill Companies, Inc.
Durrett, Timothy, P. "Plant triacylglycerols as feedstocks for the productions of biofuels." The Plant Journal (2008) vol. 54, pp. 593-607.
Fjerbaek, Lene et al. "A Review of the Current State of Biodiesel Production Using Enzymatic Transesterification." Biotechnology and Bioengineering, vol. 102, No. 5, Apr. 1, 2009.
Galitsky, Christina et al. "Energy Efficiency Improvement and Cost Saving Opportunities for the Corn Wet Milling Industry." Ernest Orlando Lawrence Berkeley National Laboratory, Jul. 2003.
Stockinger, Herman. "Converting Waste to BioDiesel." World Biofules Markets 2011, Rotterdam, Mar. 24, 2011.
Kawakami, Koei et al. "Application of a *Burkholderia cepacia* lipase-immpbilized silica monolith to batch and continuous biodiesel production with a stoichiometric mixture of methanol and Jatropha oil." Biotechnology for Biofuels, 2011, 4:42.
Luković, Nevena et al. "Biodiesel Fuel Production by Enzymatic Transesterification of Oils: Recent Trends, Challenges and Future Perspectives." Alternative Fuel, 2011, pp. 47-72.
Mittelbach, Martin. "Biodiesel: Production Technologies and Perspectives." Institute for Chemistry (IFC) Working Group Renewable Resources, Karl-Franzens-University Graz, A-0810 Graz, Austria, Sep. 19, 2005.
"Biodiesel Handling and Use Guide." National Renewable Energy Laboratory, 4th Edition, 2009.
Paynich, Mallory. "Transesterification of Vegetable Oils to Produce Biodiesel Fuel." MMG445 eJournal, 2005.
Sheedlo, Michael. "A review of the processes of biodiesel production." MMG 445 Basic Biotechnology eJournal, 2008, 4:61-65.
Tyson, K. Shaine. "Brown Grease Feedstocks for Biodiesel." National Renewable Energy Laboratory, Jun. 19, 2002.

* cited by examiner

2 ½ Gallons of Trap Grease for separation

Concentrated Trap Grease in retentate

Separated water with other contaminants and some emulsified oil content in permeate

SHOWING A REDUCTION TO ¼ OF THE ORIGINAL VOLUME

Emulsified mixture of oil and water    Clarified water after separation of emulsified oil

SEPARATION SYSTEMS FOR DEWATERING OF FOG AND BIODIESEL FUEL PRODUCTION

CROSS-REFERENCE TO RELATED APPLICATION

This application claims priority to U.S. Provisional Application No. 61/599,750 filed on Feb. 16, 2012 and U.S. Provisional Application No. 61/669,338 filed on Jul. 7, 2012, the contents of both are incorporated by reference herein for all purposes.

FIELD OF INVENTION

The present invention provides for a method for treatment of fats, oils and/or grease (FOG) for efficient removal of FOG either as dispersed in emulsions and or free-floating in a liquid medium to provide for separation of target products and/or the efficient production of biodiesel while reducing disposal of solid or liquid waste matter into landfills or water treatment facilities.

BACKGROUND OF THE INVENTION

Recognizing the negative effects of fats, oil and grease (FOG) on sewer systems and/or waste water treatment plants, it is important to inhibit FOG from entering into wastewater collection systems and/or landfill sites. Communities, counties, and water districts are grappling with the issue of how best to handle grease trap wastes. EPA estimates that about one half of all the municipal sewer clogs are the result of FOG building up in the sewer pipes. Most wastewater treatment plant managers feel that from a technical point of view, it is best to have regulations requiring restaurants to have grease traps pumped regularly, and to have the waste discharged at wastewater treatment plants where it can be properly treated and disposed of. Thus, there are grease trap pumping companies that are paid to collect the waste and paid to dump the collected FOG at facilities that can convert such FOG containing waste to inert solids or convert to useable materials such as biogas, biodiesel, biological fertilizer, etc.

Biodiesel is a diesel replacement fuel for compression-ignition (CI) engines and is a legally registered fuel and fuel additive with the U.S. Environmental Protection Agency (EPA). The EPA registration includes all biodiesel that meets the ASTM specification ASTM D 6751 and such standards do not depend on the oil or fat used to produce the biodiesel or the specific production process employed.

The biodiesel manufacturing process converts oils and fats into chemicals called long-chain mono-alkyl esters or biodiesel. These chemicals are also referred to as fatty acid methyl esters (FAME). The term mono-alkyl ester indicates that biodiesel contains only one ester linkage in each molecule. Biodiesel fuel can be produced from a variety of oils and fats such as plant oils, recycled cooking grease or oil (yellow grease) and animal fats. Animal fats may include all types of tallow, lard, yellow grease, poultry fats and fish oils. Plant oils may include, corn, canola, sunflower, rapeseed, cottonseed, etc. Biodiesel is produced through a chemical reaction of a triglycerides (TG) or free fatty acids (FFA) with an alcohol, such as methanol, to form an alkyl ester. Free fatty acids, which are found in degraded oils such as FOG, can be converted using an acid catalyst. Triglycerides can be converted using an alkaline catalyst.

Included in the grouping for conversion to biodiesel are recycled greases, such as cooking oils and restaurant frying oils. Brown grease is a material, either liquid or solid, composed primarily of fats, oils and grease from animal or vegetable sources. Yellow grease is oil and grease that comes directly from fryers and other cooking equipment. Trap grease or brown grease is waste that is recovered from grease traps and interceptors. A grease trap is a small volume device located inside a food service facility, generally under a sink, designed to collect, contain, or remove food wastes and brown grease from the waste stream while allowing the balance of the liquid waste to discharge into the wastewater collection system, usually a sanitary sewer system. A grease interceptor is a large volume device located underground and outside of a food service facility designed to collect, contain or remove food wastes and brown grease from the waste stream while allowing the balance of the liquid waste to discharge to the wastewater collection system, usually a sanitary sewer system.

Grease from meat packing houses and slaughter houses must also be addressed. It is graded according to color as white, yellow, or brown grease. White and yellow packing-house greases commonly contain only hog fat. Brown grease may also contain some beef and mutton fat, for it includes the fat from the catch basins. In large packing houses great quantities of water are used which ultimately find their way into the sewers, carrying along in their passage not inappreciable quantities of fats. To recover these it is customary to let the waters settle in basins before they finally flow into the sewer. In these basins fat rises to the surface; it is then skimmed off and combined with the brown grease. Such recovered greases may be used in the manufacture of bio-diesel fuels, soap, candles, lubricants and certainly included in some types of animal feed. As such, recovering a substantial portion is important not only as a value added product but also to prevent entry into sewer systems.

In light of the above discussion, there is a need for separation systems that can effectively separate dispersed FOG from emulsions and separate free-floating FOG from a waste stream to provide dewatered emulsions and separated fats, oils and greases thereby providing value added separated product while producing a minimal amount of negative effects on sewer systems, wastewater treatment facilities and/or landfill sites.

SUMMARY OF THE INVENTION

In accordance with the present invention, there is provided a method to process fats, oil and grease, such as trap oils, trap grease, yellow grease, brown grease and grease trap waste by dewatering thereby providing separated water and a concentrated viscous material for further processing and simplifying disposal conditions, while recuperating or recycling valuable commodities therein.

In one aspect, the present invention provides for subjecting raw grease product, including but not limited to trap oils, yellow greases, brown greases and grease trap waste to a pretreatment, that being a first purification step wherein unwanted solids, food particles, debris are removed from trap grease by the use of screen meshing, centrifugal filter, or a similar filtering device; and a separation step wherein water is removed from the purified grease with the use of a cross-flow filtration unit of the present invention to form a permeate water stream and a retentate trap grease stream.

A second purification step may be conducted on the permeate water stream to remove organic or inorganic products passed through the first cross-flow filtration unit and which would constitute excess waste levels for the local waste water treatment facility. For example biological oxygen demand (BOD) or total suspended solids (TSS) levels can be reduced using a second cross-flow filtration unit that comprises filtration membranes having increased rejection characteristics or smaller pore sizes than the first cross flow filtration unit to provide essentially clear water permeate stream. The retentate trap grease stream is moved on for further processing to produce desired commodities including animal feed, candles, lubricants and preferably biodiesel fuels.

In another aspect, the present invention provides for a separation method for separating water from FOG containing liquid-type medium, the method comprising the steps of:
(a) providing FOG containing liquid-type medium, wherein the liquid-type medium is a viscous liquid, non-viscous liquid or an emulsion;
(b) providing at least one cross-flow filtration cassette comprising:
   an array of sheet members of generally rectangular and generally planar shape with main top and bottom surfaces, wherein the sheet members include in sequence in said array a first retentate sheet, a first filter sheet, a permeate sheet, a second filter sheet, and a second retentate sheet, wherein the fatty acids and triglycerides, having a diameter larger than the filter sheet's pore size, are retained in the retentate flow, and at least a portion of the liquid medium with any permeate species diffuse through the filter sheets and enter the permeate sheet and permeate flow; and
(c) directing the FOG containing liquid-type medium through the cross-flow cassette to separate water and/or FOG from the liquid-type medium.

Notably, the FOG containing liquid-type medium may be pretreated to remove any unwanted material or larger solids from the liquid medium before the separation process, wherein the pretreating may include systems such as the cross-flow filtration cassette of the present invention, wherein the permeate and filter screens are sized for retention of the larger solids while allowing passage of FOG content into a permeate stream, centrifuge, vibrating screen, mesh screening, belt filter, screw press, hydrocylcone and other systems that remove debris or further reduce particle size to ensure easy flow through the next separation step.

Preferably, each of the sheet members in said array has at least one inlet basin opening at one end thereof, and at least one outlet basin opening at an opposite end thereof, with permeate passage openings at longitudinal side margin portions of the sheet members, wherein each of the first and second retentate sheets having a multiplicity of channel openings therein, extending longitudinally between the inlet and outlet basin openings of the sheets in the array, and being bonded to an adjacent filter sheet about peripheral end and side portions thereof, with their basin openings and permeate passage openings in register with one another and the permeate passage openings of each of the retentate sheets being circumscribingly bonded to the adjacent filter sheet, and with a central portion of each of the retentate sheets and adjacent filter sheets being unbonded to permit permeate contacting the retentate sheet to flow through the filter sheet to the permeate sheet.

In one embodiment membranes can be made of a polymeric material having a hydrophobic profile that hinders the passage of water molecules because of the high surface tension of water. Liquids with high surface tension, such as water in an oil-water emulsion, pulls together other water molecules and the oil fraction is not included, wherein such aggregation of water molecules creates a surface tension gradient that cause the liquid with high tension to stay away from the hydrophobic membranes. Thus, the oil fraction wets the polymeric membrane and with some pressure can moved through the permeate screen, and thus, using a wetted hydrophobic membrane causes the separation of oil type constituents from water in a passing emulsion stream.

In yet another aspect, the present invention provides for production of biodiesel fuel from FOG containing liquid-type medium in an emulsified form, wherein the FOG containing liquid-type medium comprises free fatty acids and triglycerides, the method comprising:
(a) providing FOG containing liquid-type medium, wherein the FOG containing liquid-type medium is optionally pretreated to remove any large particles therefrom;
(b) moving the FOG containing liquid-type medium through a cross-flow filtration unit according to the present invention wherein such FOG containing liquid-type medium is dewatered and the water content is separated into a water permeate stream and the remaining FOG containing liquid-type medium in the retentate stream is collected;
(c) combining the retentate stream with an alcohol and acid catalyst in a reaction vessel to cause an esterification reaction to convert the free fatty acids to esters;
(d) separating the alcohol from the formed esters and triglycerides, wherein the alcohol is subjected to a second cross-flow filtration unit of the present invention for purification and reuse or disposal;
(e) combining the esters and triglycerides with an alkaline salt and methanol to cause a transesterification reaction to convert triglycerides to esters thereby forming crude biodiesel and crude glycerin;
(f) separating the crude glycerin and methanol from the crude biodiesel using a third cross-flow filtration unit of the present invention.

Optionally the crude glycerin, that includes methanol, can be further purified by use of an additional cross-flow filtration unit of the present invention to provided refined glycerin. Also the water permeate stream can be further purified to remove any unwanted organic or inorganic molecules such as BOD and/or TSS with a cross-flow filtration unit of the present invention to provide a further purified water permeate stream.

Esterification is preferably conducted using methanol and sulfuric acid as the acid catalyst. However, biodiesel can be made from methyl, ethyl, isopropyl and other alcohols, but most biodiesel fuels focuses on methyl esters. Transesterification is conducted in the presence of an alkaline salt and methanol wherein the alkaline salt can be selected from sodium methoxide, sodium hydroxide, potassium hydroxide, etc. Glycerin is a sugar and a co-product of the biodiesel process. Notably, if the trap grease does not include a large amount of free fatty acids, the esterification process can be elimination and only transesterification process is conducted. The transesterification is conducted with methanol and an alkaline salt, wherein the methanol solvent component provides for the esterification of the small amount of free fatty acids and the conversion to a mono-alkyl ester. Transesterification process provides for two separate phases, that being, a crude biodiesel phase and a glycerin phase. The crude biodiesel phase is further subjected to acid treatment to neutralize the alkaline salt and such neutralize phase is subjected to water washing to provide finished biodiesel after a drying process such as using the cross-flow filtration cassette of the present invention. The glycerin phase can be further subjected to acidification and cross-flow filtration to remove any remaining methanol that may be reused in the transesterification process and provide for refined and purified glycerin.

The removal of water and sediment from biodiesel is important because excessive water during storage can cause biodiesel to be out of specification. Further, excess water can lead to corrosion and provide an environment for microorganism growth. Still further, the reduction of water content of trap grease reduces the cost of such grease because of high transportation cost, such as moving trap grease from grease interceptors to a centralized reaction area for further processing into biodiesel. The removal of alcohol is important because residual methanol in the fuel is a safety issue and even a small amount can reduce flash point, affect fuel pumps and seals. Finally the removal of glycerin and the quantitation of such glycerin provide an indication of the completeness of conversion of triglycerides into biodiesel. For example, incomplete conversion of triglycerides to long chain mono alky esters can lead to lower levels of glycerin because the transesterification reaction was not completed.

In yet a further aspect, the present invention provides for a system to process trap grease and separate all fats, oils, and grease dispersed therein by using the cross-flow filtration cassettes of the present invention to obtain a homogenous grease or oil, free from inert materials, water and solids, suitable for other oleo-chemical processes and applications. Additionally, the present system can process trap grease by dewatering and recuperating the separated water and any solvent used at the separation stage for delivery back to a pre-mixing tank for its continued use.

In another aspect, the present invention provides for a multi-step separation process that includes optimal finishing of a FOG containing liquid medium including not only free floating FOG but an emulsion layer comprising dispersed FOG, wherein a first cross-flow filtration cassette of the present invention is used to separate the water from the free floating FOG and a second cassette for treating the emulsion layer to separate any remaining FOG from the water containing emulsion.

Other aspects and advantages of the invention will be more fully apparent from the ensuing disclosure and appended claims.

DETAILED DESCRIPTION OF THE INVENTION

The present invention is a system for treating of trap grease, brown grease, and/or yellow grease for the production of biodiesel fuel.

The term "trap grease" as used herein refers to fats, oil, grease (FOG) recovered from slaughter houses, restaurants and sewage treatment plants, wherein the trap grease includes but is not limited to animal fats, bacon grease, brown grease, yellow grease, sewage grease, black grease, waste sludge grease, vegetable oils, lard and removable debris.

The term "emulsion" as used herein refers to a thermodynamically unstable system consisting of at least two immiscible liquid phases, one of which is dispersed as globules in the other liquid phase. When an oil phase is dispersed as globules throughout an aqueous continuous phase, the system is referred to as an oil-in-water (o/w) emulsion and when the oil phase serves as the continuous phase, the emulsion is referred to as a water in oil (w/o) emulsion.

The term "cross-flow filtration cassette" refers to a type of filter module or filter cassette that comprises a porous filter element across a surface of which the liquid medium to be filtered is flowed in a tangential flow fashion, for permeation through the filter element of selected component(s) of the liquid medium. In a cross-flow filter, the shear force exerted on the filter element (separation membrane surface) by the flow of the liquid medium serves to oppose accumulation of solids on the surface of the filter element. Cross-flow filters include microfiltration, ultrafiltration, and nanofiltration systems. The cross-flow filter may comprise a multiplicity of filter sheets (filtration membranes) in an operative stacked arrangement, e.g., wherein filter sheets alternate with permeate and retentate sheets, and as a liquid to be filtered flows across the filter sheets, impermeate species, e.g. solids or high-molecular-weight species of diameter larger than the filter sheet's pore size, are retained and enter the retentate flow, and the liquid along with any permeate species diffuse through the filter sheet and enter the permeate flow. In the practice of the present invention, cross-flow filtration is a preferred separation method. Cross-flow filter modules and cross-flow filter cassettes useful for such filtration are commercially available from Smartflow Technologies, Inc. (Apex, N.C.). Suitable cross-flow filter modules and cassettes of such types are variously described in the following United States patents: U.S. Pat. No. 4,867,876; U.S. Pat. No. 4,882,050; U.S. Pat. No. 5,034,124; U.S. Pat. No. 5,034,124; U.S. Pat. No. 5,049,268; U.S. Pat. No. 5,232,589; U.S. Pat. No. 5,342,517; U.S. Pat. No. 5,593,580; and U.S. Pat. No. 5,868,930; the disclosures of all of which are hereby incorporated herein by reference in their respective entireties.

Figure 1:
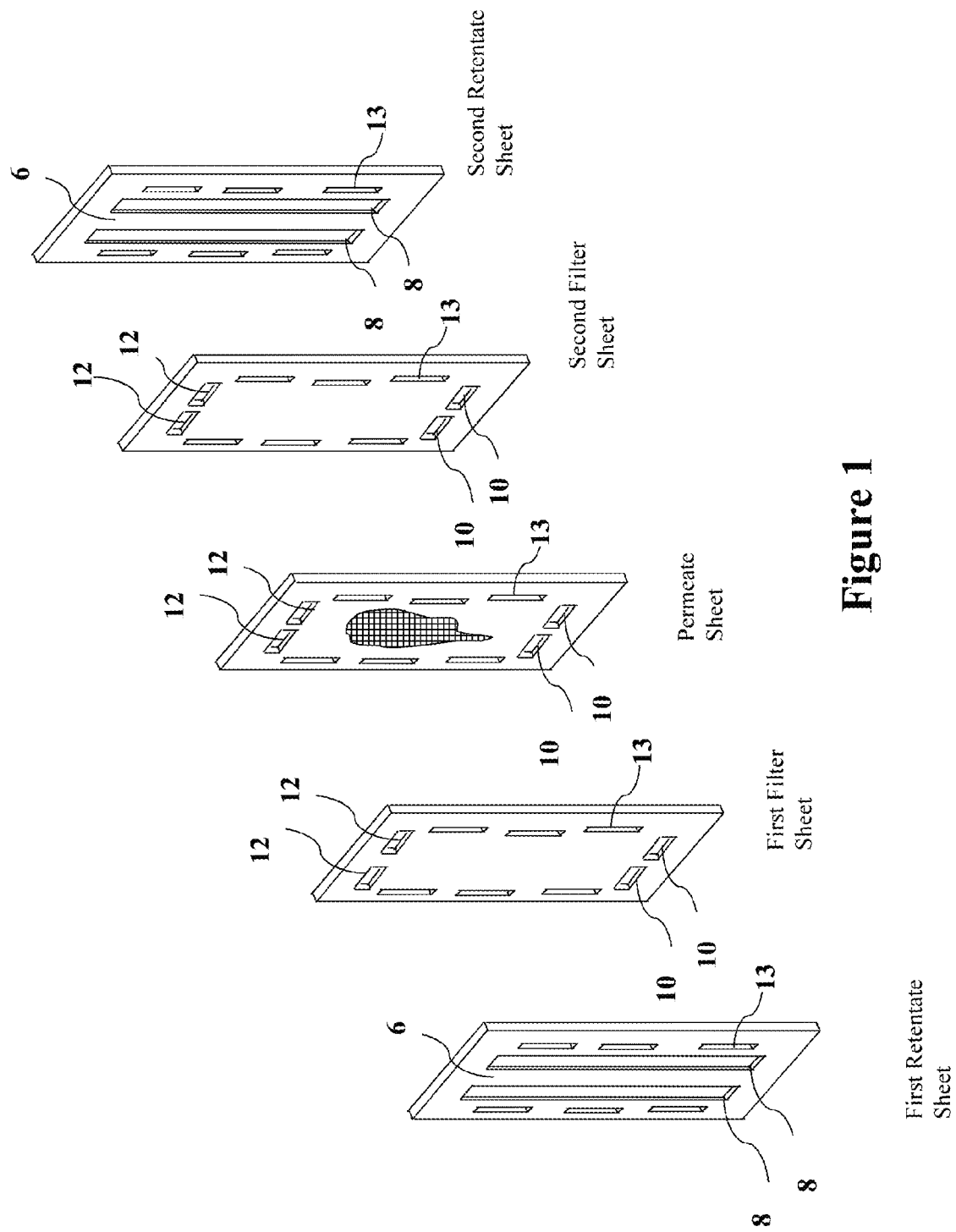
FIG. 1 shows the components of a cross-flow filtration cassette used in the separation of trap grease.

In one particular aspect, the present invention relates to a cross-flow filtration cassette, as shown in FIG. 1, comprising a multilaminate array of sheet members of generally rectangular and generally planar shape with main top and bottom surfaces, wherein the sheet members include in sequence in said array a first retentate sheet, a first filter sheet, a permeate sheet, a second filter sheet, and a second retentate sheet, wherein each of the permeate and filter sheet members in said array has at least one inlet basin opening 10 at one end thereof, and at least one outlet basin opening 12 at an opposite end thereof, with permeate passage openings 13 at longitudinal side margin portions of the sheet members;

each of the first and second retentate sheets having at least one channel opening 8 therein, extending longitudinally between the inlet 10 and outlet basin 12 openings of the permeate and filter sheets in the array, and being compression bonded to an adjacent filter sheet about peripheral end and side portions thereof, with their basin openings and permeate passage openings in register with one another and the permeate passage openings of each of the retentate sheets being circumscribingly compression bonded to the adjacent filter sheet, and with a central portion of each of the retentate sheets and adjacent filter sheets being unbonded to permit permeate contacting the retentate sheet to flow through the filter sheet to the permeate sheet; and each of the filter sheets being secured at its peripheral portions on a face thereof opposite the retentate sheet, to the permeate sheet.

The term "sheet" will denote the generally planar members of the cassette, the cassette thus comprising an assembly of permeate sheets, filter sheets, and retentate sheets, coupled to one another in such manner as to permit flow of the fluid to be separated through the flow channel(s) of the device, for mass transfer involving passage of the permeate through the filter sheets, and retention of the retentate on the side of the filter sheet opposite the side from which the permeate emerges.

The term "compressible" in reference to the retentate sheet or other structural feature or sheet member of the present invention means that such component or member is compressively deformable by application of load or pressure thereon.

The above-described filtration cassette of the invention comprises a "base sequence" of elements, defined as a sequence of sheet elements constituting a compressible retentate sheet (hereafter designated by the symbol "CR"), a filter sheet (hereafter designated by the symbol "F"), a foraminous permeate sheet (hereafter designated by the symbol "P"), a second filter sheet ("F"), and a second compressible retentate sheet ("CR"), thereby providing a sequence of sheet elements, CR/F/P/F/CR.

Figure 2:
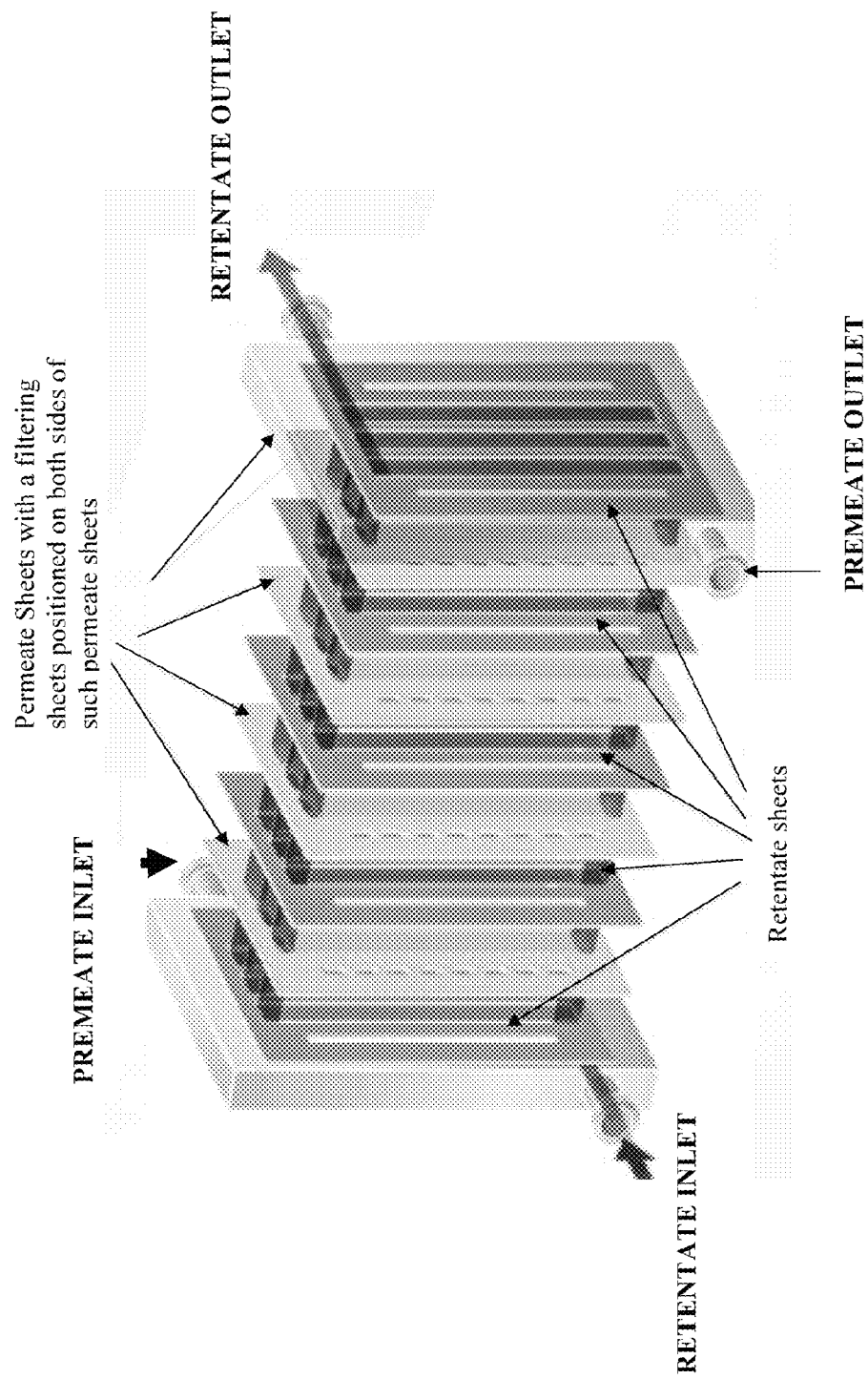
FIG. 2 shows the flow pattern of the retentate through a multiplicity of sheets adapted to end plates with retentate inlet and outlet and permeate inlet and outlet.

The base sequence of sheet elements may be utilized in construction of filters comprising a plurality of filtration cassettes, wherein the compressible retentate sheet is utilized to seal the top and bottom elements of a plurality of filtration cassettes of a sequence, comprising compressible retentate sheet "CR", filter sheet "F", foraminous permeate sheet P, filter sheet "F", non-compressible retentate sheet "R", filter sheet "F", foraminous permeate sheet P, filter sheet "F", and compressible retentate sheet "CR". An illustrative stacked cassette filter according to the invention may for example feature the sheet sequence CR/F/P/F/R/F/P/F/R/F/P/F/CR as shown in FIG. 2, comprising a first compressible retentate sheet, two base sequences of sheets FPFRFPF in a repetitive sequence, and a second compressible retentate sheet. In all repetitive sequences, other than a single cassette base sequence, the following relationship is observed: where X is the number of filter sheets F, the quantity 0.5 X−1 is the number of non-compressible retentate sheets R, and the quantity 0.5 X is the number of foraminous permeate sheets P, with two compressible retentate sheets being utilized to seal the top and bottom extremities of the intervening sequence.

Thus, it is possible to utilize a large number of base sequence cassettes in a repetitive sequence, to provide a stacked cassette filter of the desired mass transfer area. Many configurations are possible. It is feasible in some instances, e.g., for mass transfer studies and system quantitation, to utilize a single cassette comprising the base sequence CR/F/P/F/CR wherein the outermost retentate sheets in the sequence are compression-sealed at their outer faces to an end plate accommodating removal of permeate from the permeate passage openings of the constituent sheet members in the cassette.

The sheets of filter material used in the cassette article of the present invention may be of any suitable porosity rating. As used herein, the porosity rating of a sheet of filter material is the smallest particle size which cannot pass through the pores of the filter material. Typical porosity ratings are expressed in molecular weight (MW) and micrometer units, e.g., a 2 micron filter media sheet being a material which will pass particles smaller than 2 microns in diameter through the pores of the material, while particles larger than 2 microns will not be passed through the filter material, and as a further example, a 10,000 MW filter media sheet being a material which will pass particles smaller than 10,000 MW in diameter through the pores of the material, while particles larger than 10,000 MW will not be passed through the filter material.

In one preferred embodiment of the cassette article of the present invention, a retentate sheet is provided with a plurality of transversely spaced-apart, longitudinally extending ribs or partitions, extending upwardly from (the central portion of) each of the main top and bottom faces of the retentate sheet, such ribs or partitions being of substantially the same height and substantially parallel to one another to define a series of channels between the partitions, extending longitudinally between the respective basin openings of the retentate sheet, on both faces thereof. The adjacent filter sheets may be further bonded to the outer extremities of the ribs or partitions, and the ribs or partitions may be formed of any suitable material, e.g., a flexible resilient adhesive bonding medium, such as a urethanes, epoxy or silicone adhesive sealant medium, e.g., applied in a "bead" in the longitudinal direction of the retentate sheet on both main top and bottom faces thereof.

The term "bonded" in reference to adjacent sheets in the multilaminate cassette means that the adjacent sheets are secured to one another in such manner as to prevent flow of the material being processed, e.g., the feed material to be separated, as well as component materials therefrom (filtrate or permeate, as well as retentate), from flowing through such secured areas or between the adjacent sheets at such secured areas. Preferably, the bonding is carried out by compressive bonding or with a suitable adhesive or sealant medium, e.g., a urethane, epoxy, cyanoacrylate, or silicone adhesive material, which fills the interstices of the foraminous sheet in the bonded pair of sheets, and adhesively joins one of the adjacent sheets to the other in the bonded areas.

The term "compressive bonding" and "compressively bonded" refer to bonding and bonding operations in which the structure being bonded is subjected to a compressive load or force, for sufficient time and under sufficient period to effect the bonding securement of the structure. Compressive bonding of laminae in the practice of the invention is highly desirable, in order to assure the leak-tightness and structural integrity of the resulting multilaminate assembly of the cassette.

The invention may for example be carried out with bonding of sheets in the multilaminate array to one another with cyanoacrylate or other "fast" adhesives, or alternatively the adhesive or sealant medium may require extended cure at ambient temperature or other appropriate cure conditions, and it may be advantageous to conduct such cure with the laminate structure in a fixture or other assembly in which the compressive bonding is effectively completed.

In a specific aspect of the invention, each of the foraminous permeate sheets may constitute a foraminous material of from about 80 to about 300 mesh size. Each of the foraminous permeate sheets may for example comprise a woven polymeric mesh, e.g., of a material selected from the group consisting of polyester, polypropylene, nylon, fluorocarbon polymers such as polytetrafluoroethylene, polyethylene, and polysulfone, and composites comprising one or more of such materials.

The filter sheets used in the filtration cassette of the present invention may be of any suitable materials, such as a material selected from the group consisting of cellulose, polyphenylene oxide, polysulfone, cellulose nitrate, cellulose acetate, regenerated cellulose, polyether amide, polyphenylene oxide/polysulfone blends, mixed esters of cellulose, and polyether sulfone.

Furthermore, it is possible to optimize the separate processes with cross-flow filtration modules of variable channel velocities but of uniform channel heights, given the fact that most commercial cross-flow modules are only available in a single channel height. When the channel height of a cross-flow filtration module is known, shear is directly proportional to channel velocity of such module for the same solution passing by.

In the literature, numerous techniques have been proposed to effect the separation of target substances using membrane separations with addition of foreign substances such as acid, base, salt and solvents. In contrast to these chemical additives-based methods, the methodology of the present invention permits a target substance to be separated from an input fluid by the simplest mechanical means. In the use of cross-flow filtration modules of the type described in the aforementioned patents, the specificity and speed of a desired separation is effected by a) fluid distribution in the cross-flow module, b) channel height of the cross flow module, c) channel length, d) shear rate, e) membrane pore structure, f) membrane structure, g) membrane chemistry, h) trans-membrane pressure, and i) pressure drop, which is a function of channel length, velocity and solution viscosity.

The approaches by others involving various additives and manipulations of transmembrane pressure appear to be predicated on overcoming problems created by poor distribution of flow within the cross-flow module. It is not to say that the addition of salts and solvents do not have a place in separation but without proper flow distribution the membrane separation cannot be optimally operated nor will cleaning techniques be fully beneficial. It will be appreciated, based on the disclosure herein that numerous heretofore expensive or difficult separations are rendered far simpler and more economical by employing the techniques described herein.

Thus, the invention relates in another aspect to optimizing the membrane separation process, comprising:
selecting a cross-flow membrane module wherein the distance from the inlet port to the outlet port is equidistant from the inlet to outlet for each sub-channel of the device, i.e., each sub-channel is of a same dimensional character; selecting an optimal channel height;
selecting an optimal shear rate and/or channel velocity;
selecting an optimal transmembrane pressure;
selecting an optimal rejection characteristics of the filter membrane;
selecting an optimal temperature;
selecting an optimal channel length; and
selecting an optimal pressure drop which is the composite of the optimal channel height;
the optimal shear rate and/or channel velocity;
optimal channel length; and
the viscosity of the solution being filtered.

Selecting a channel height can be performed mathematically or empirically by trial and error. In most cell fermentation applications, trial and error has been more appropriate due to the fact that the viscosity of the cell broth or product solution is rarely known, the cell count and cell viability are highly variable, and the solution is frequently non-Newtowian. The objective of channel selection is to minimize channel height with three critical stipulations: first, the channel must be sufficiently high to allow the unrestricted passage of any larger material such as clumped cells; second, the channel should not cause excessive pressure drop and loss of linear efficiency; and third, the channel should be sufficiently high as to allow the proper angle of attack for substances to encounter the membrane pore and pass through the pore. The optimal channel height is dependent on the length and viscosity of the solution.

Several notable observations have been made in initial trials and process scale-up, as discussed below.

For suspensions having an optical density (OD) of 2 to 500, and a path length of 6 to 12 inches, start with a channel height between 0.4 to 0.75 mm. If the inlet pressure is above 15 PSIG at a velocity of 2.0 M/sec, then the channel is too thin.

For suspensions having an optical density (OD) of 2 to 500, and a path length of 6 to 12 inches, start with a channel height between 0.4 to 0.75 mm. If the inlet pressure is below 5 PSIG at a velocity of 2.0 M/sec the channel is too high.

For suspensions having an optical density (OD) of 2 to 500, and a path length of 25 to 40 inches, start with a channel height between 0.7 to 1.0 mm. If the inlet pressure is above 15 PSIG at a velocity of 2.0 M/sec, the channel is too thin.

For suspensions having an optical density (OD) of 2 to 500, and a path length of 25 to 40 inches, start with a channel height between 0.7 to 1.0 mm. If the inlet pressure is below 5 PSIG at a velocity of 2.0 M/sec, the channel is too high.

Another aspect of the present invention relates to a stacked cassette cross-flow filter comprising cassette articles of the type described above.

Still another aspect of the present invention relates to a pair of end plates or manifold assembly in which the cassettes are secured for operation as shown in FIG. 2.

Figure 3:
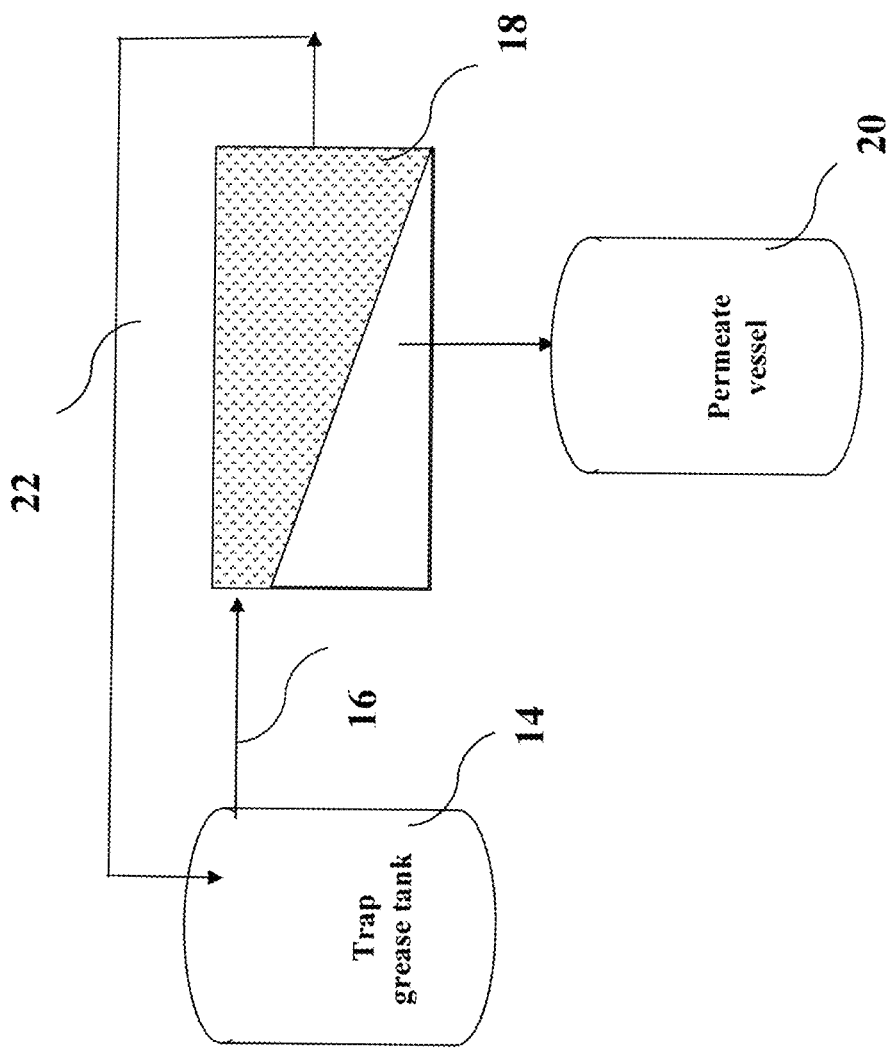
FIG. 3 shows a system for dewatering of trap grease for pretreatment before esterification and/or transesterification reactions.

FIG. 3 shows a system for dewatering a tank 14 of collected trap grease. The trap grease is removed from the tank and is introduced to the cross-flow filtration cassette 18 wherein the trap grease is separated into a retentate and a permeate. The retentate comprising the dewatered trap grease may be returned to the tank via process line 22 or sent on for further processing (not shown). The permeate (separated water) is introduced to the permeate vessel 20. Notably, the permeate can be further filtered using a second cross-flow filtration cassette of the present invention to further remove impurities and provide purified water that can be imported into a wastewater stream.

The components of the cross-flow filtration cassette 18 are described in FIG. 1 and relates to a filtration cassette comprising a multilaminate array of sheet members of generally rectangular and generally planar shape with main top and bottom surfaces, wherein the sheet members include:
(a) a first compressible retentate sheet of suitable material, e.g. polysulfone, polyethersulfone, polycarbonate, urethane, silicone, or other compressible material of construction, having (i) at least one longitudinally extending rib or partition element 6, such partition element(s) when provided in multiple configuration being transversely spaced apart from one another and being of substantially the same height and substantially parallel to one another to define a single or a series of channels 8 between the partitions, extending longitudinally between the respective inlet 10 and outlet 12 basin openings of associated filter elements and permeate sheet members, on both faces thereof, (ii) permeate passage openings 13 at side portions of the sheets, and (iii) the retentate sheet aligned to the first sheet of filter material at respective end and side portions thereof, with the basin openings and permeate passage openings of the associated sheet members in register with one another and the permeate passage opening of the retentate sheet member being circumscribingly compressed to the first sheet of filter material, and with a central portion of the first sheet of filter material and the retentate sheet member being unbonded to permit permeate contacting the retentate sheet member to flow through the first sheet member of filter material to the foraminous permeate sheet member;

(b) a first sheet member of filter material having (i) multiple basin openings, of a suitable shape, e.g., polygonal, semicircular, or sector shape, at each of opposite end portions of the sheet member defining respective inlet 10 and outlet 12 passages, each basin being bounded by generally linear side edges defining corners of the basin at respective intersections of the side edges, and (ii) permeate passage openings 13 at the side portions of the sheet member, wherein the first sheet member of filter material is bonded to the foraminous permeate sheet member at their respective end and side portions, with their basin openings and permeate passage openings in register with one another and the basin openings being circumscribingly bonded at respective end portions of the first sheet member of filter material and the foraminous permeate sheet member, and with a central portion of the first sheet member of filter material and the foraminous permeate sheet member being unbonded so as to define a central portion permeate channel of the foraminous permeate sheet communicating with the permeate passages in the first sheet member of filter material and in the foraminous permeate sheet member;

(c) a foraminous permeate sheet member of screen or mesh material, having (i) multiple basin openings of suitable shape at each of opposite end portions of the sheet member defining respective inlet 10 and outlet 12 passages, each basin being bounded by generally linear side edges defining corners of the basin at respective intersections of the side edges, and (ii) permeate passage openings 13 at the side portions of the sheet member;

(d) a second sheet member of filter material having (i) multiple basin openings at each of opposite end portions of the sheet member defining respective inlet 10 and outlet 12 passages, each basin being bounded by generally linear side edges defining corners of the basin at respective intersections of the side edges, and (ii) permeate passage openings 13 at the side portions of the sheet member, wherein the second sheet member of filter material is compression sealed to the retentate sheet member at their respective end and side portions, with their basin openings and permeate passage openings in register with one another and the permeate passage opening of the retentate sheet member being compression sealed to the second sheet member of filter material, and with a central portion of the second sheet member of filter material and the retentate sheet member being unbonded to permit permeate contacting the retentate sheet member to flow through the second sheet member of filter material; and (e) a second compressible retentate sheet member of suitable material, e.g. polysulfone, polyethersulfone, polycarbonate, urethane, silicone, having (i) at least one longitudinally extending rib or partition element 6, provided that when multiple partition elements are employed, the partition elements are transversely spaced-apart from one another, such partition elements being of substantially the same height and substantially parallel to one another, to define a single channel 8 or a series of channels between the partitions, extending longitudinally between the respective inlet and outlet basin openings of the filter elements and permeate sheet members, on both faces thereof, (ii) permeate passage openings 13 at the side portions of the sheet member, and (iii) the retentate sheet compression sealed to the second sheet of filter material at respective end and side portions thereof, with their basin openings and permeate passage openings in register with one another and the permeate passage opening of the retentate sheet member being compression sealed to the second sheet member of filter material, and with a central portion of the first sheet member of filter material and the retentate sheet member being unbonded to permit permeate contacting the retentate sheet member to flow through the second sheet member of filter material to the foraminous permeate sheet member.

In operation, the cross-flow filtration cassette provides a barrier through which the trap grease and long chain fatty acids and triglycerides are substantially restricted from passing through the filter sheets and allows the trap grease concentration to be increased.

After passing through the cross-flow filtration cassette, the permeate preferably includes a greatly reduced amount of trap grease. The retentate, which is returned to tank may still include some water and thus can be recirculated again. The water permeate may be further purified with the use of a second cross-flow filtration cassette wherein the pores of the filter sheet comprises a smaller diameter than the originally used cassette. Notably, if the trap grease does not include a large amount of free fatty acids, the esterification process can be elimination and only transesterification process is conducted. The transesterification is conducted with methanol and such solvent component provides for the esterification of the small amount of free fatty acids and the conversion to a mono-alkyl ester.

Figure 4:
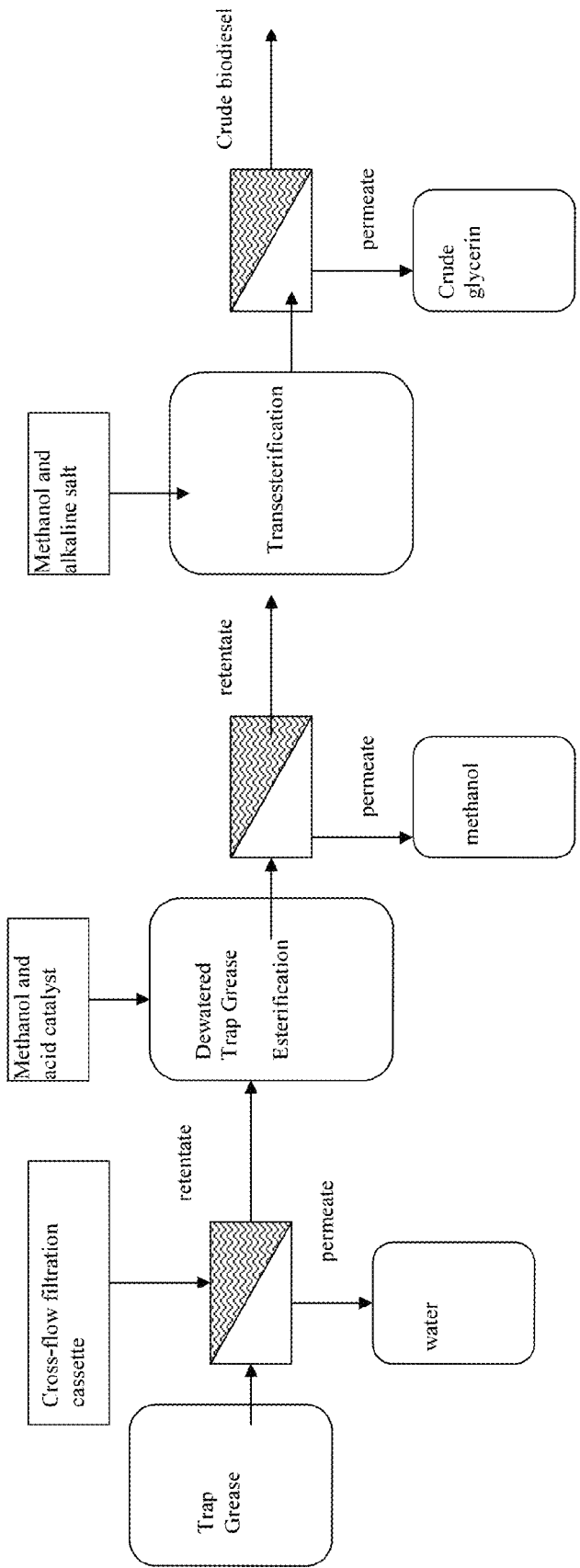
FIG. 4 shows a system using both esterification and transesterification processes for isolating the desired biodiesel product and purification of reaction products.

FIG. 4 illustrates one embodiment for converting trap grease to biodiesel. Initially, the trap grease, comprising both free fatty acids and triglycerides, may be subjected to size reduction by screening to remove large particle and unwanted material (not shown). The next step includes the pretreatment of the trap grease to remove water from the trap grease to increase concentration of the trap grease. The increased concentration of trap grease is mixed with methanol and an acid catalyst to initiate and provide for an esterification reaction of any free fatty acids in the trap grease. The methanol is removed and the esterified trap grease is subjected to a transesterification reaction by combining with methanol and an alkaline salt. After completion of the transesterification reaction the methanol and any formed glycerin is removed for further separation and purification. The esters are further refined for biodiesel.

Figure 5:
FIG. 5 is a photo showing a 2½ gallon of raw trap grease to be dewatered using the cross-flow filtration unit of the present invention.
Figure 6:
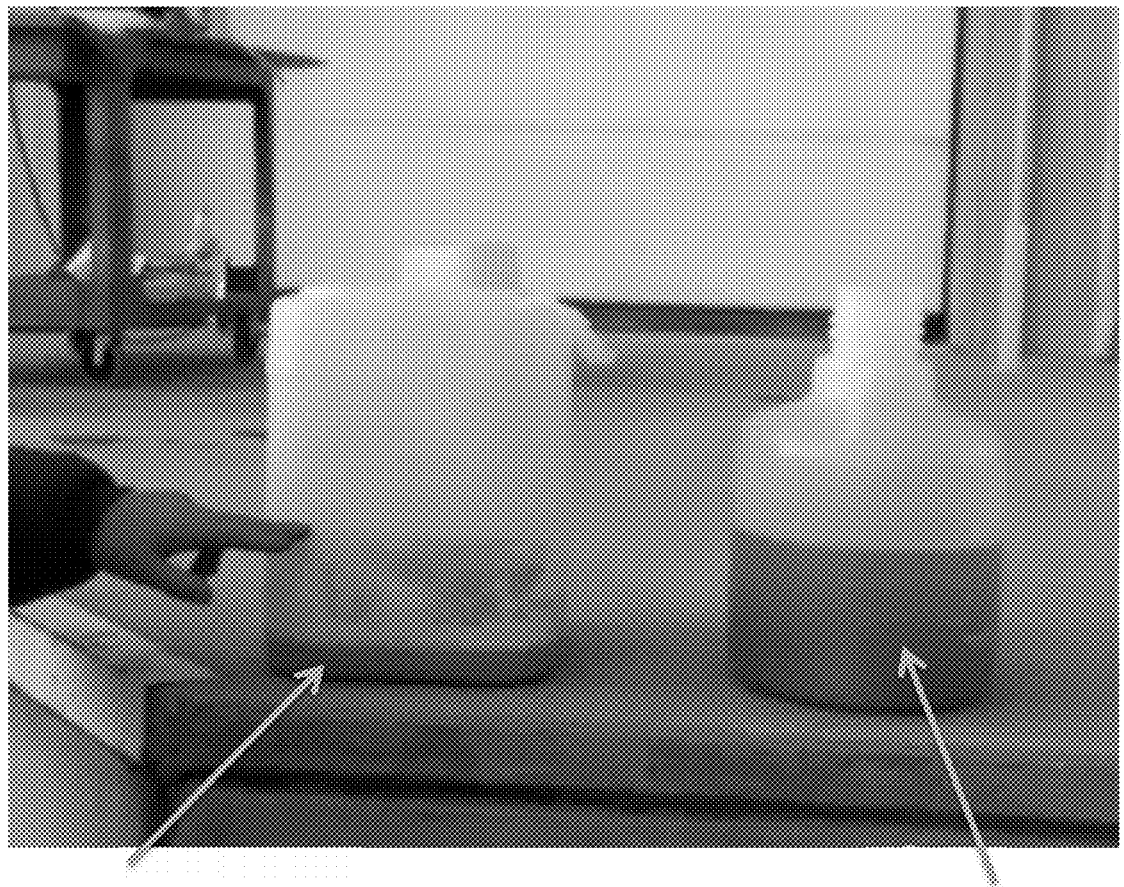
FIG. 6 is a photo showing the separation of the water (permeate) from the raw trap grease, wherein the volume of raw trap grease (retentate) has been reduced to ¼ of the original volume.
Figure 7:
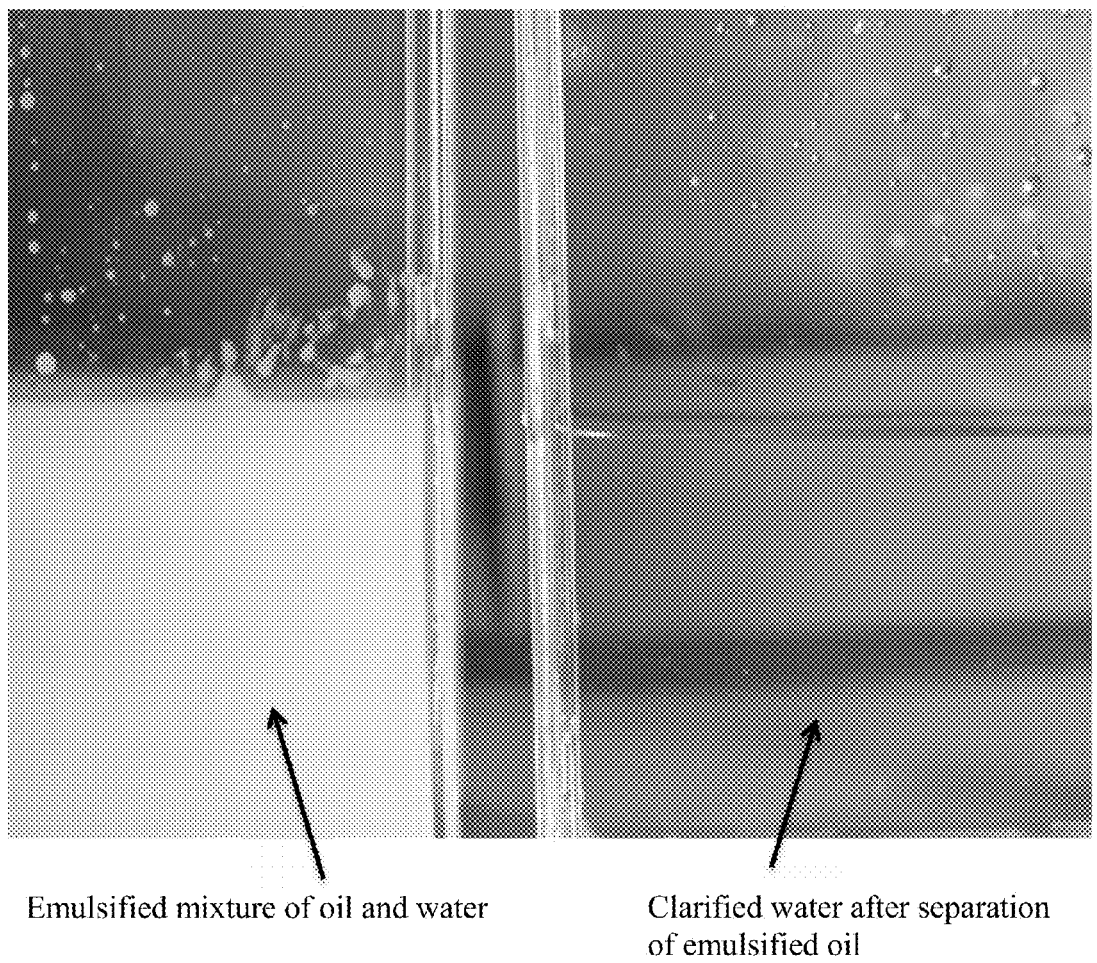
FIG. 7 shows the separation of water from an emulsion comprising dispersed FOG in water.

FIG. 5 shows a container comprising raw trap grease that is going to be treated and passed a cross-flow filtration cassette of the present invention. Moving on to FIG. 6, one can see that after the separation the retentate comprises the separated and concentrated fats, oils and grease in the container shown a reduction to about ¼ of the original volume. The other container includes that contents of the permeate stream comprising separated water and any emulsified FOG remaining in the liquid. FIG. 7 shows that the permeate stream has been further purified wherein any emulsified FOG contained in the left side container is removed to provide cleaner and clearer water as shown in the right side container.

That which is claimed is:

1. A separation method for separating water from a fat, oil and/or grease (FOG) containing liquid-type medium, the method comprising the steps of:
   (a) providing a water and FOG containing liquid-type medium, wherein the liquid-type medium is a viscous liquid, non-viscous liquid or an emulsion and the FOG containing liquid-type medium is trap grease that comprises free fatty acids and triglycerides;
   (b) providing a first cross-flow filtration cassette comprising:
      an array of sheet members of generally rectangular and generally planar shape with main top and bottom surfaces, wherein the sheet members include in sequence in said array a first retentate sheet, a first filter sheet, a permeate sheet, a second filter sheet, and a second retentate sheet, wherein the fatty acids and triglycerides, having a diameter larger than the filter sheet's pore size, are retained in a retentate stream, and at least a portion of the liquid medium with any permeate species diffuse through the filter sheets and enter the permeate sheet and permeate stream;
   (c) directing the water and FOG containing liquid-type medium through the first cross-flow cassette to separate water from the FOG, and wherein the fatty acids and triglycerides are retained in the retentate stream;
   (d) combining the retentate stream of the trap grease with an alcohol and acid catalyst in a reaction vessel to cause an esterification reaction to convert the free fatty acids to esters;
   (e) separating the alcohol from the formed esters and triglycerides, wherein the alcohol is subjected to a second cross-flow filtration unit for purification and reuse or disposal;
   (f) combining the formed esters and triglycerides with an alkaline salt and methanol to cause a transesterification reaction to convert triglycerides to esters thereby forming crude biodiesel and crude glycerin;
   (g) separating the crude glycerin and methanol from the crude biodiesel using a third cross-flow filtration unit, wherein the methanol is removed and thereby forming a refined glycerin; and
   (h) removing the crude biodiesel for further refining.

2. The separation method according to claim 1, wherein the FOG containing liquid-type medium is pretreated to remove any unwanted material or larger solids from the liquid medium before separating water from a fat, oil and/or grease (FOG) containing liquid-type medium.

3. The separation method according to claim 2, wherein pretreating is conducted in a system selected from the group consisting of: centrifuge, vibrating screen, mesh screening, belt filter, screw press and hydrocylcone.

4. The separation method according to claim 1, wherein each of the sheet members in said array has at least one inlet basin opening at one end thereof, and at least one outlet basin opening at an opposite end thereof, with permeate passage openings at longitudinal side margin portions of the sheet members, wherein each of the first and second retentate sheets having a multiplicity of channel openings therein, extending longitudinally between the inlet and outlet basin openings of the sheets in the array, and being bonded to an adjacent filter sheet about peripheral end and side portions thereof, with their basin openings and permeate passage openings in register with one another and the permeate passage openings of each of the retentate sheets being circumscribingly bonded to the adjacent filter sheet, and with a central portion of each of the retentate sheets and adjacent filter sheets being unbonded to permit permeate contacting the retentate sheet to flow through the filter sheet to the permeate sheet.

* * * * *